UNITED STATES PATENT OFFICE.

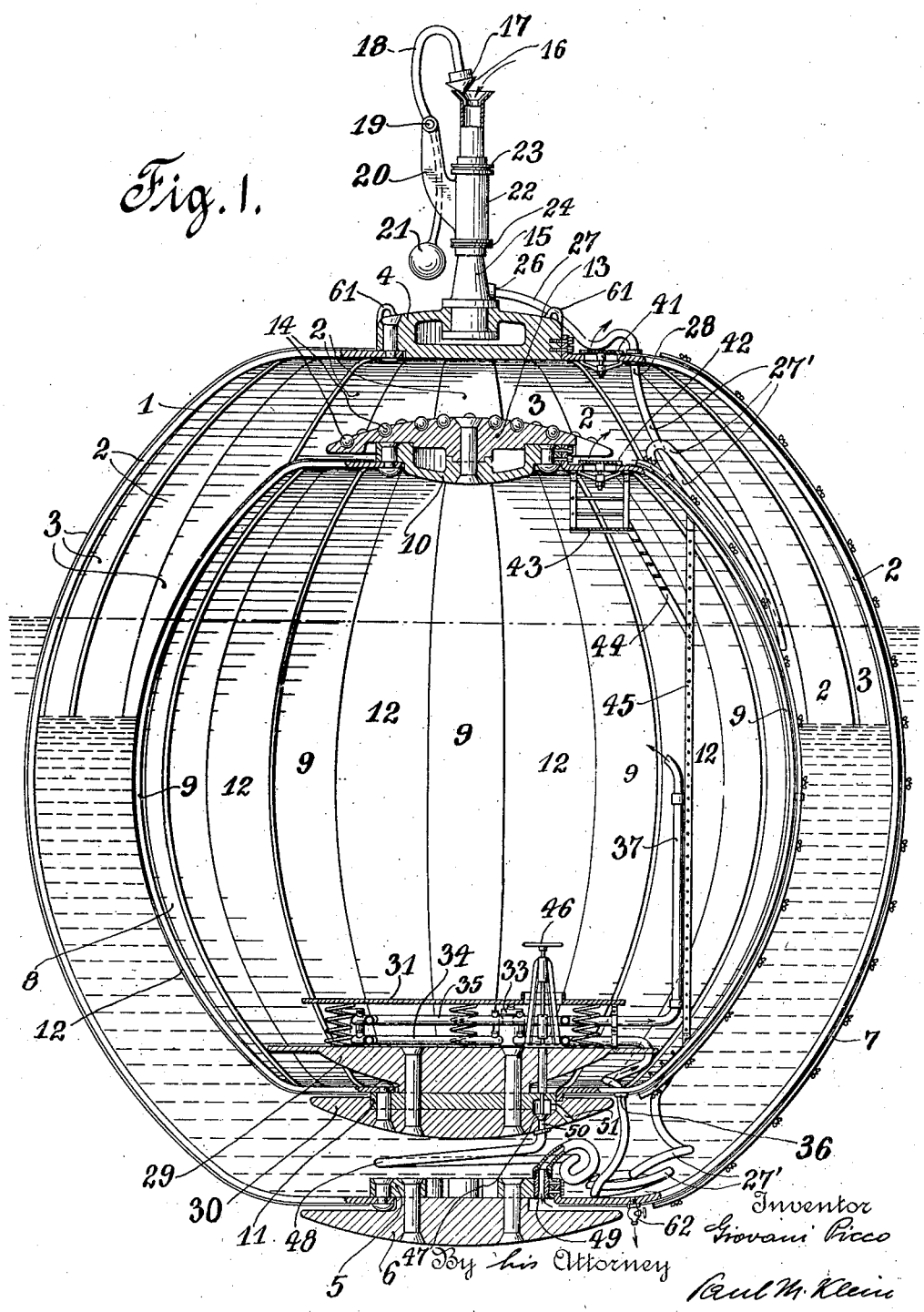

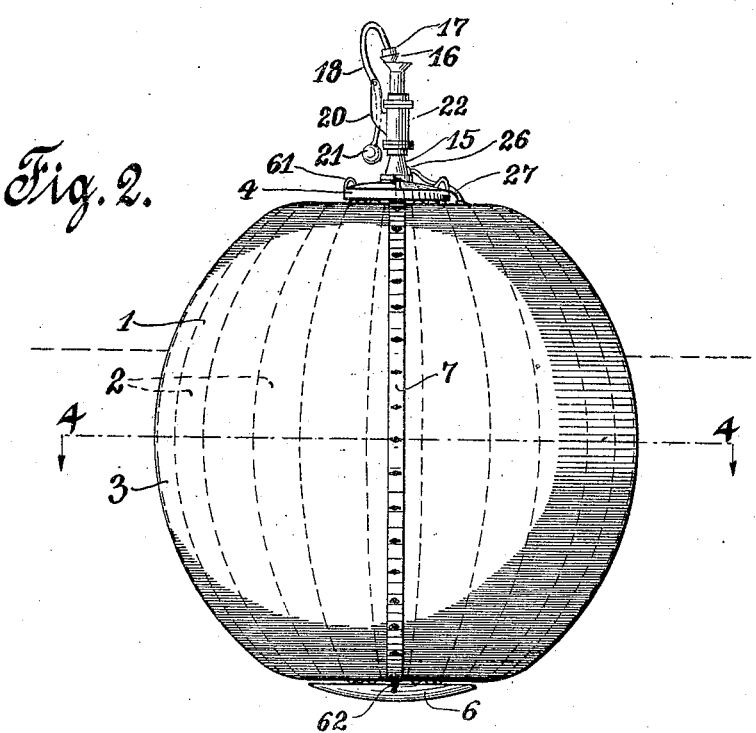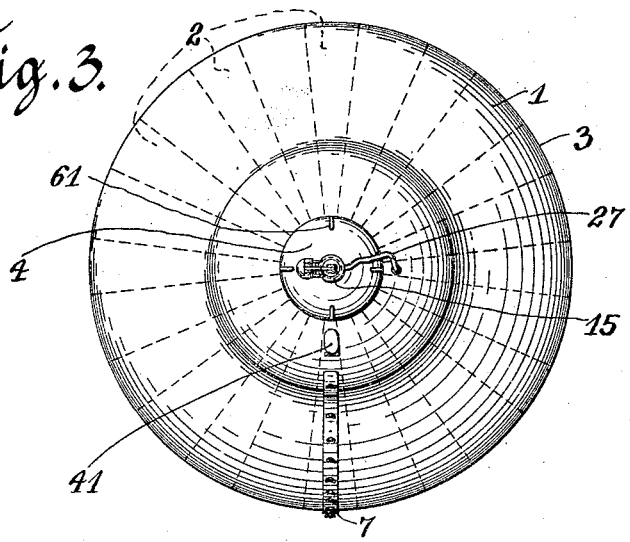

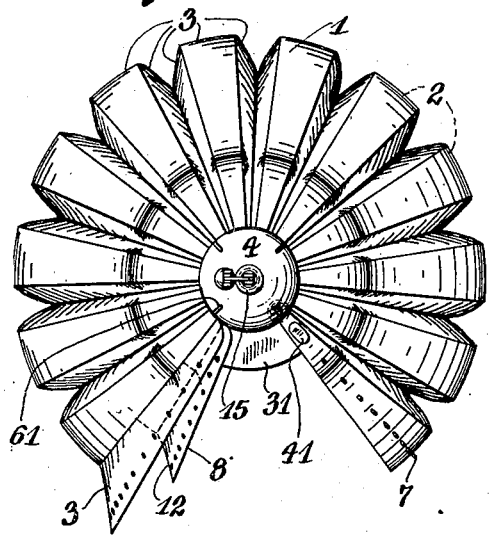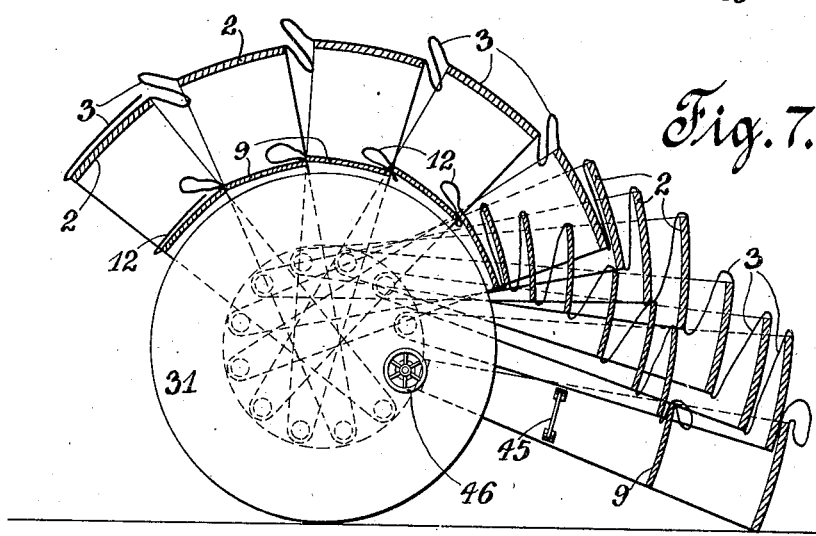

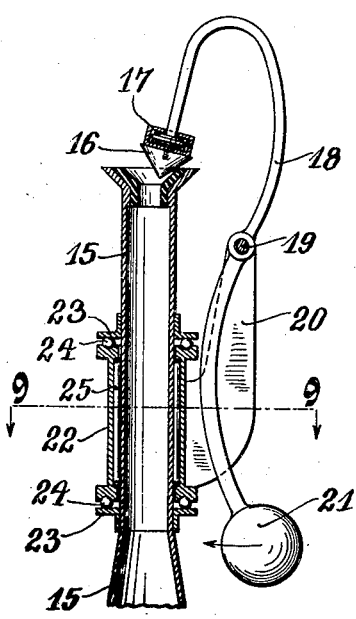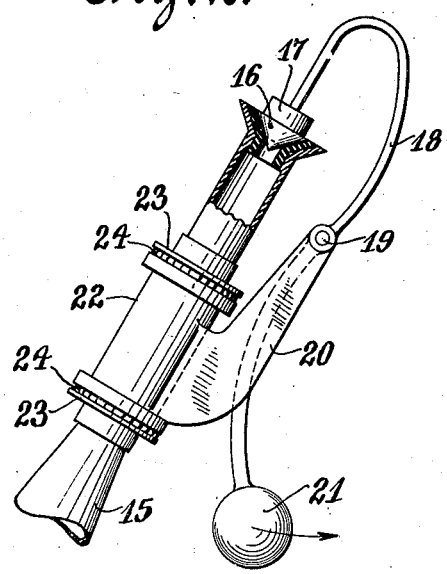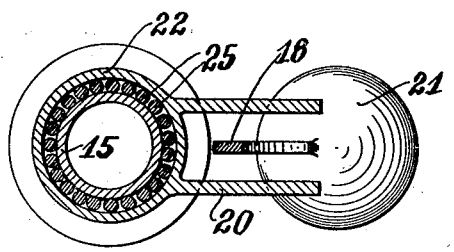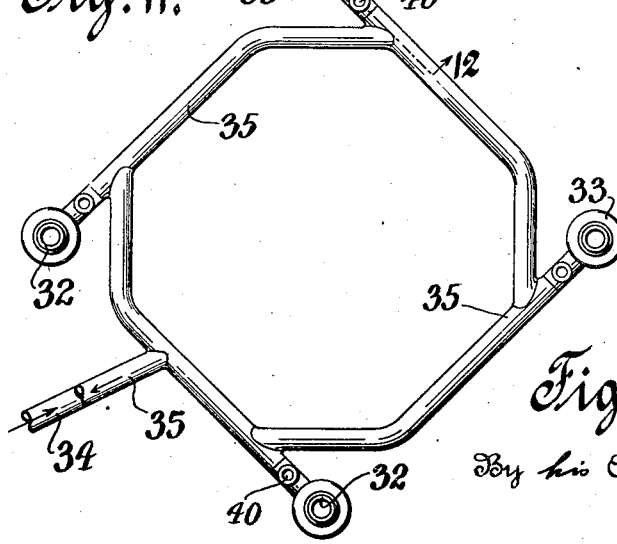

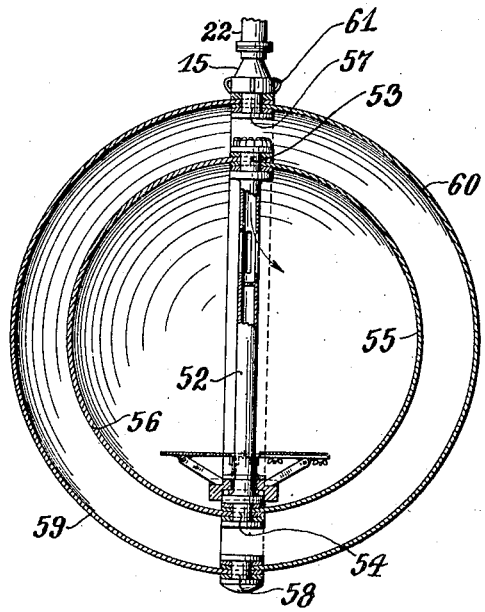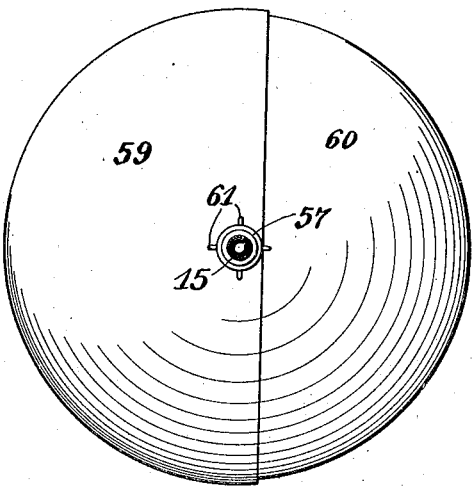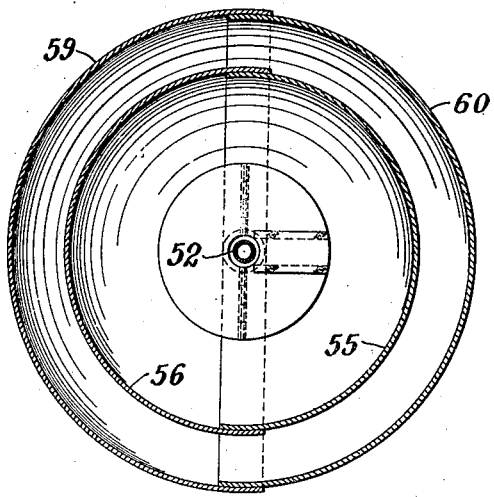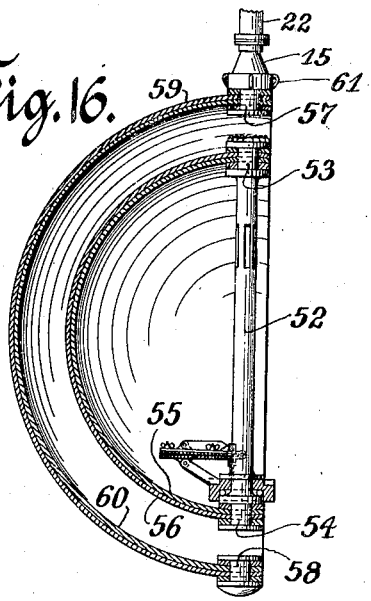

GIOVANNI PICCO, OF NEW YORK, N. Y.

LIFE-SAVING APPARATUS.

1,378,273.  Specification of Letters Patent.  Patented May 17, 1921.

Application filed August 23, 1920. Serial No. 405,238.

*To all whom it may concern:*

Be it known that I, GIOVANNI PICCO, a subject of the King of Italy, and resident of New York, in the county of New York and State of New York, have invented certain new and useful Improvements in Life-Saving Apparatus, of which the following is a specification.

This invention relates to life saving apparatus and consists of a combination of floating vessels of novel construction in connection with devices hereinafter fully described and claimed.

The primary objects of my invention are to provide a safe life saving apparatus which will be unaffected by high going sea, which cannot sink unless badly damaged, and which will afford the occupants a relatively stable and comfortable resting place until rescued.

Another object of my invention is to provide in connection with such apparatus valve controlled air supply means so arranged as to allow the entrance of air for the occupants' consumption while preventing water from entering.

Still another object of my invention is to provide air and water conduits facilitating the unobstructed relative movement of units comprising my device.

Further objects of my invention are to provide auxiliary devices operable by the occupants for artificially supplying air and for controlling the inflow and outflow of water when desired.

A further object of my invention is to provide the upper portion of one of the units with anti-friction devices for engaging with the upper portion of the other unit.

These and other objects will be readily understood from the following description and the accompanying drawings, forming part of this specification, and in which:

Figure 1 is a cross-sectional view through my device in operative position.

Fig. 2 is an elevation of same in closed position.

Fig. 3 is a top view thereof.

Fig. 5 is a top view of my device in partially open position.

Fig. 6 is an elevation thereof.

Fig. 7 illustrates my device in folded position.

Fig. 8 is a detail view of the valve-controlled air duct partially in section.

Fig. 9 is a cross-sectional view taken on line 9—9 of Fig. 8.

Fig. 10 illustrates the air duct in inclined position with the valve forced closed.

Fig. 11 is a detail view of the auxiliary air pumping arrangement.

Fig. 12 is an enlarged detail cross-sectional view taken on line 12—12 of Fig. 11.

Fig. 13 illustrates a modified form of my device in cross-section.

Fig. 14 is a plan view thereof in closed position.

Fig. 15 is a cross-sectional view taken on line 15—15 of Fig. 14.

Fig. 16 illustrates the modified form in collapsed or folded state.

Figure 4:
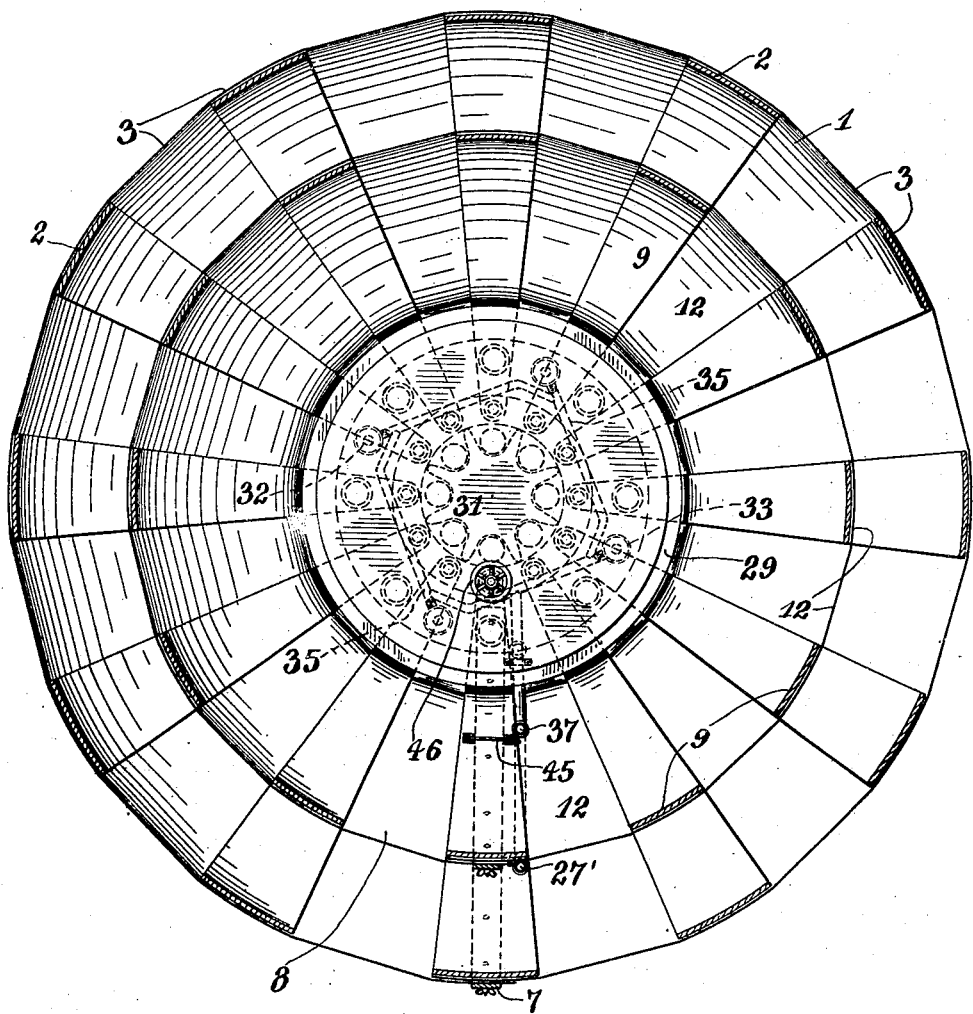
Fig. 4 is a transversal cross-sectional view taken on line 4—4 of Fig. 2.

Referring to the drawings, an outer vessel 1 is illustrated composed of a plurality of reinforcing sections 2 connected and covered by a waterproof cloth or any other suitable material 3. Each of the sections is pivotally secured at both ends to headers 4 and 5 and so arranged as to be collapsible in the manner shown in Fig. 7 for facilitating its storing on deck of a ship without occupying too great a space. The lower header is provided with a weight 6 while the upper header 4 is made far lighter in weight.

The closing ends of vessel 1 possess conventional fastening means indicated at 7 whereby a watertight connection is assured.

The inner vessel 8 is constructed in a similar way to that of the outer vessel 2, being composed of stiff sections 9 pivoted at headers 10 and 11 and being covered and interconnected through flexible, waterproof member 12.

At the top header an anti-friction device 13 is provided, composed of a convex body in which is revolvingly lodged a plurality of bearing balls 14 adapted to engage the upper portion of the outer vessel when the vessels are caused to move in relation to each other.

Secured at the top header 4 of the outer vessel is an air duct 15 provided with an automatically operating valve 16 at the upper opening of the duct. This valve is rotatably connected at 17 with a pivoted valve stem 18 (see Figs. 8, 9, and 10) fulcrumed at 19 in a bracket 20 and weighted by ball 21.

Bracket 20 forms a part of a sleeve 22 surrounding a portion of duct 15 and held in place by flanged collars 23 provided with ball bearings 24. Between sleeve and duct are roller bearings 25 for reducing friction to a minimum.

When the outer vessel is in perfect perpendicular position either still or revolving around its own vertical axis, valve 16 opens due to the action of weight 21.

At the moment, however, when the outer vessel becomes inclined, no matter in which direction, the valve tends to close and will close entirely when the deviation reaches a certain degree. In this manner water is prevented from entering into the duct at rough sea, while air is admitted whenever the vessel reaches an upright or nearly upright position when swinging to and fro.

Connected at the lower portion of the air duct at 26 is a flexible, waterproof air conduit 27 passing through the hull of the outer vessel and into the inner vessel at 28.

As will be observed the air conduit is loosely suspended so as not to interfere with relative movements of the vessels.

The lower header 11 of the inner vessel is provided with an inner weighted platform 29 and dished outer weight 30.

Upon platform 29 is arranged a spring supported seat 31 to which are connected plungers 32 (Figs. 11 and 12) of auxiliary air supply pumps 33.

The pumps are interconnected with each other by way of conduits 34 and 35, the former communicating at 36 with an extension 27' of the flexible conduit 27, which passes down and around the inner vessel.

The upper conduit 35 terminates in supply pipe 37.

By moving platform 31 up and down the plungers 32 are actuated, thereby sucking in air through pipe 34 and discharging it through pipes 35 and 37 into the inner vessel after having forced the air to pass and to be trapped by a series of valves 38, 39 and 40 (Fig. 12).

At both upper portions of the globular vessels are provided manholes 41 and 42 for permitting access when the vessels are closed. Below manhole 42 of the inner vessel is a railed-in platform 43 from which occupants may descend into or ascend from the inner vessel by way of step ladder 44 and ladder 45.

Conveniently arranged upon weighted platform 29 is a controlling device 46 actuating a water inlet valve 47 by means of which water may be allowed to enter into the space between the vessels. A flexible conduit 48 terminating at 49 without the hull of the outer vessel and at 50 in the valve chamber of valve 47 conveys water therethrough when the valve is lifted and by way of passage 51 into the outer vessel.

In Figs. 13, 14, 15 and 16 a modified form of my invention is illustrated where the globular vessels are formed by pivoted semispheres arranged to register with each other.

The inner vessel is provided with a hollow shaft 52 the ends 53 and 54 are built out to hinges around which swings inner shell 55 while the outer shell 56 is stationary.

Similarly constructed is the outer vessel having hinge-heads 57 and 58 and an outer shell 59 and inner shell 60. The arrangement of other parts is substantially the same as that described above.

For conveniently handling the apparatus from deck of ship and for facilitating its lowering into water, hooks or ears 61 are provided at the upper header of the outer vessel. A pet cock 62 at the bottom of the outer vessel (Fig. 1) serves as drain.

Operation:

In case of danger the folded apparatus is closed, or partially closed and suspended from the ship. It may be occupied while in suspended and somewhat open position, whereafter it is closed from without and lowered. The pet cock 62 at the bottom of the outer vessel is closed before lowering while valve 47 is opened. Water is permitted to enter into the outer vessel until the inner vessel floats freely. Then valve 47 is closed and the apparatus released.

When hoisting the apparatus after a rescue, water is released first through valve 47 and later, when accessible, cock 62 is opened.

While my drawings illustrate preferred but specific forms of my device be it understood that this invention shall not be limited to the construction shown. I reserve for myself, therefore, the right to make changes and improvements within the broad scope of my invention.

I claim:

1. In a life saving apparatus, the combination of an inner and an outer vessel of substantially globular shape, said vessels made of collapsible sections with intervening waterproof connections, and adapted to be closed from without, an air duct secured to the outer vessel, a rotatably mounted valve associated with said duct, a counterweight connected with the valve and adapted to keep it normally open when said outer vessel is in upright position and to close it when the vessel is inclined, a flexible hose connecting said duct with the inner vessel for permitting the latter to roll within the outer vessel, a manhole provided in the outer vessel, a similar manhole provided on top of the inner vessel, a rounded top provided with anti-friction devices mounted at the upper end of the inner vessel, a weighted platform within and at the bottom of said inner vessel, a spring supported seat secured to said platform and having associated therewith a pumping mechanism for supplying air, a water valve operable from within the inner vessel and adapted to supply water into or drain it from the space between the vessels and a cock valve provided at and communicating with the outer vessel.

2. A life saving apparatus, comprising in combination outer and inner globular vessels, said vessels consisting of hinged sections interconnected by waterproof flexible fabric, and adapted to be folded up, closed or opened, an air duct provided on top of the outer vessel and equipped with a rotatable valve adapted to close when the vessel swings out of its normal vertical position, a flexible air conduit connecting the duct with the inner vessel and adapted to facilitate the vessels assuming various positions relative to each other, manholes provided on top of each vessel, an anti-friction device associated with the upper part of the inner vessel, a weighted platform at the bottom of the inner vessel, a spring actuated seat resting upon the platform, auxiliary air pumps operable through up and down movements of said seats, a water valve for regulating the inflow and outflow of water in the space between the two vessels and operable from within the inner vessel, and a flexible water conduit controlled by said water valve and adapted to facilitate the relative movement of the vessels for facilitating entering and leaving the vessel.

3. A life saving apparatus, comprising in combination foldable inner and outer vessels, both adapted to float in water, controlling means operable from within the inner vessel for facilitating the entrance of water in the space between the vessels to any desired degree, valve controlled air conduits associated with the outer vessel for supplying air to the inner vessel, air pumps within the inner vessel connected with said conduits, and anti-friction means provided at the top of the inner vessel adapted to engage the upper part of the outer vessel when the vessels change their relative position while floating.

4. A life saving apparatus, comprising an outer and an inner vessel, the former adapted to be partially filled with water, the inner vessel adapted to float in the water of the outer vessel, means for entering the vessels, means for supplying air to the inner vessel, means for controlling from within the inner vessel the in and outflow of water into the outer vessel and means for facilitating the relative movement of the vessels when both are afloat.

Signed at New York, in the county of New York, and State of New York, this 20 day of August A. D. 1920.

GIOVANNI PICCO.